United States Patent [19]

Fujioka et al.

[11] 4,246,503
[45] Jan. 20, 1981

[54] GAS FLOW COOLING SYSTEM FOR A ROTARY ELECTRIC MACHINE

[75] Inventors: Kazumasa Fujioka, Shimoinayoshi; Wataru Nakayama, Kashiwa, both of Japan

[73] Assignee: Hitachi, Ltd., Japan

[21] Appl. No.: 968,985

[22] Filed: Dec. 13, 1978

[30] Foreign Application Priority Data

Dec. 16, 1977 [JP] Japan .................. 52-150567

[51] Int. Cl.³ ................................ H02K 9/00
[52] U.S. Cl. .............................. 310/59; 310/62
[58] Field of Search ............ 310/55, 52, 53, 57, 310/58, 60, 64, 65, 59, 62, 63

[56] References Cited

U.S. PATENT DOCUMENTS

| | | | |
|---|---|---|---|
| 3,254,246 | 5/1966 | Philofsky | 310/57 |
| 3,428,838 | 2/1969 | Carson | 310/57 |
| 3,439,202 | 4/1969 | Wanke | 310/58 |
| 3,739,208 | 6/1973 | Shartrandt | 310/58 |
| 4,039,872 | 8/1977 | Armor | 310/55 |
| 4,051,400 | 9/1977 | Armor | 310/58 |
| 4,071,791 | 1/1978 | Armor | 310/65 |

*Primary Examiner*—R. Skudy
*Attorney, Agent, or Firm*—Craig & Antonelli

[57] ABSTRACT

A hermetic casing filled with a cooling gas contains a stator core having cooling ducts in radial direction, and a rotor comprised of a rotor body and an end-winding region and a fan for circulating the cooling gas. The cooled gas is divided into two flows at fan outlet by the dividing wall. One gas flow pressurized by the fan makes its way to the rotor end region and cools the same, and is discharged to the armature end region. The other gas flow pressurized by the gas goes to the stator core and the rotor body and cools the same, and then is discharged to the inlet side of the cooler. The two gas flows merge with each other at the inlet of the cooler, is cooled through the cooler, and reach the fan inlet region.

5 Claims, 1 Drawing Figure

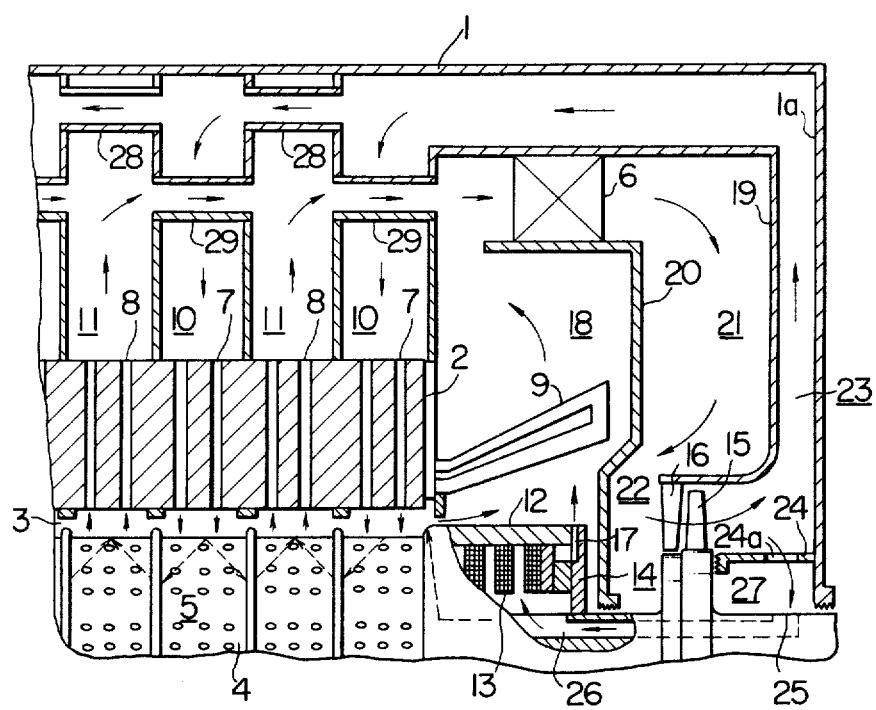

GAS FLOW COOLING SYSTEM FOR A ROTARY ELECTRIC MACHINE

The present invention relates to a rotary electric machine having an internal cooling system, or more in particular to a rotary electric machine in which the radial flow of gas is utilized to cool the stator core and a gap pick-up system is used to cool the rotor.

An example of the conventional cooling system for the rotary electric machine of the above-mentioned type is disclosed in Japanese Utility Model Publication No. 44884/76, in which the gas that has passed through the cooler flows along the end wall of the casing, is pressurized by a fan, and discharged to the end-winding side of the rotor. Part of the gas cools the end-winding region of the rotor and is discharged to the inlet side of the fan, while the remaining part of the gas cools the stator core and rotor body and returns to the cooler.

Another example of the conventional cooling system is disclosed in Japanese Patent Laid-Open Publication No. 64403/73 corresponding to U.S. Pat. No. 3,739,208, wherein the gas that has passed through the cooler is divided into two flow paths. The gas that enters one flow path cools the stator core and the rotor body and is collected at or in the neighbourhood of the end-winding of the rotor, while the gas that enters the other flow path flows to the end-winding region of the rotor through the path along the end wall of the casing, cools the end-winding of the rotor, is discharged outside, and merges with the gas that has cooled the stator core and the rotor body. The merged gas flows into the fan, and is pressurized and returned to the cooler.

In the first example, the resistance to flow at the rotor end-winding region is so large that most of the gas is used to cool the stator core and rotor body and little gas flows to the rotor end-winding region. As a result, the temperature rise of the rotor end-winding increases extremely, thus posing a barrier to increased capacity. Further, in view of the fact that the gas is discharged into a large space by the fan, the dynamic pressure fails to be recovered as the static pressure but is lost, thus making it impossible to attain a high pressure.

According to the second example, on the other hand, the gas that has left the cooler in order to cool the rotor end-winding turns the direction by 180 degrees, flows through the path along the casing end wall, and reaches the rotor end-winding region, resulting in a very large flow resistance. Like in the first example, little gas flows to the rotor end-winding region, so that the temperature of the end-winding rises extremely.

An object of the present invention is to provide a rotary electric machine having an improved cooling system in which the cooling of the rotor end-winding region is improved by effectively using the high pressure immediately after the fan outlet and by providing a gas flow path with a low flow resistance.

According to the present invention, there is provided a rotary electric machine with the flow of the cooling gas divided into two paths. The gas flowing along one path is pressurized by a fan, passes through a path along the end wall of the casing, and flows to the stator core and the rotor body. After cooling them, the gas is discharged to the inlet side of the cooler. The gas in the other path, by contrast, after being pressurized by the fan, passes through a path bored in the rotor shaft, and enters the rotor end-winding region. After cooling the rotor end-winding, the gas is discharged into the end region of the armature communicating with the inlet of the cooler. The two divided gases merge with each other at the inlet of the cooler, and after being cooled in the cooler, reach the fan inlet. The gas is then pressurized again by the fan and circulated to cool the stator and the rotor.

The diagram shows a sectional view of an end of the upper half portion of the hydrogen gas-cooled generator as an example of the rotary electric machine according to the present invention.

A typical embodiment of the present invention will be described in detail with reference to the attached diagram showing a sectional view of the construction at an end of the upper half of the hydrogen-gas-cooled type generator as an example of a rotary electric generator. The generator has a sealing casing 1 for containing the hydrogen cooling gas. The casing 1 contains a stator core 2, a cooler 6, and a rotor 5 having a body 4 spaced from the stator core 2 through a gas gap 3. The stator core 2 includes cooling ducts 7 and 8 disposed radially with respect to the shaft of the rotor and spaced from each other at proper intervals. The stator core 2 also has a slot for holding the main armature winding 9 cooled by a liquid cooling system provided independently from the cooling system according to the invention. Inlet chambers 10 and outlet chambers 11 surround the outer periphery of the stator core 2 alternately in such a manner that the inlet chamber 10 and the outlet chamber 11 respectively opposite to the cooling ducts 7 and 8. The rotor 5 has, at each end thereof, an end-winding region 14 including an end-winding 13 held in a predetermined position by a retaining ring 12. The rotor 5 also supports a set of fans 15 to which the gas is guided by a fixed guide vanes 16.

The body 4 of the rotor 5 is separated into a plurality of regions disposed axially in opposition to the radial cooling ducts 7 and 8. These regions are cooled by the gap pick-up system in such a manner that the gas is introduced by way of the gas gap 3 and flows through internal inclined cooling paths in the rotor winding thereby cooling these regions by the gas.

At the end of the retaining ring 12 of the end-winding region 14, a centrifugal fan 17 is arranged in such a manner that its outlet side communicates with the armature end region 18. The end-winding 13 is cooled by the centrifugal fan 17. The cooler 6 is located in the path 21 formed between a flow guide wall 19 and a flow dividing wall 20 within the casing 1. The inlet of the cooler 6 communicates with the armature end region 18 and the outlet chambers 11 provided at the outer periphery of the stator core 2, while the outlet thereof communicates with the inlet region 22 for the fan 15. An outlet path 23 of the fan 15 is defined by a casing end wall 1a, a flow guide wall 19 and a flow dividing wall 24, and communicates with the inlet chambers 10 on the outer periphery of the stator core 2. The flow dividing wall 24 has an opening 24a, so that the gas is introduced to an end chamber 27 communicating with the end-winding region 14 through a rotor opening 25 and a path 26 disposed longitudinally along the axis of the rotor.

Explanation will be made about the flow of the cooling gas in the rotary electric machine according to the present invention with reference to the example shown in the drawing. The first gas flow, after being pressurized by the fan 15, enters the end chamber 27 through the opening 24a of the flow-dividing wall 24, and makes its way into the end-winding region 14 through the longitudinal path 26 by way of the opening 25 of the rotor shaft. The first gas then flows through the internal paths (not shown) of the end-winding for cooling the end-winding region 14, and is discharged into the armature end region 18 by the centrifugal fan 17. Another gas flows from the gas gap 3 into the armature end region 18, thus cooling the main armature coil 9, and is discharged to the inlet of the cooler 6.

The second gas flow, after being pressurized by the fan 15, passes through the path 23, and is distributed into the inlet chambers 10 by way of a multiplicity of tubes 28 disposed above the outer periphery of the rotor. The gas then flows into the gas gap 3 through the radial cooling ducts 7. Part of the gas sent into the gas gap 3 at first passes through one region of the rotor body 4, and flowing through the internal inclined cooling path of the rotor winding, is applied to another region of the rotor body 4 and flows again into the gas gap 3. Further, flowing through the radial cooling ducts 8, the gas is collected in the outlet chambers 11 surrounding the stator core 2 alternately with the inlet chambers 10 on the periphery of the stator core 2, thus cooling the stator core 2 and the rotor 5. The gas thus collected at the outlet chambers 11 flows to the inlet of the cooler 6 through a multiplicity of tubes 29 on the outer periphery of the stator core 2, is cooled by the cooler 6 together with the gas discharged from the armature end region 18, and supplied to the inlet region 22 of the fan 15 through the path 21. The cooled gas flow is pressurized again by the fan 15 and circulated for cooling purposes.

According to the present invention, the gas flow path from the fan outlet to the rotor end-winding is shortened, thereby reducing the flow loss. Further, the gas flowing in the rotor end-winding is fed directly from the fan outlet so that the high pressure immediately after the fan is effectively utilized to cool the end-winding. As a result, the gas flow rate in the end-winding is increased extremely, thereby effectively cooling the end-winding. Also, in view of the fact that with the fan outlet located at the path side, the gas flow is discharged into a small space, so that the dynamic pressure, which otherwise might be lost in conventional cooling system, is considerably recovered as static pressure thus making it possible to attain a high pressure for effective cooling.

What is claimed is:

1. A rotary electric machine comprising:

a hermetic casing filled with a cooling gas;

a stator core having a plurality of cooling ducts in a radial direction;

a rotor having a rotor body cooled by the self-pumping effects of a plurality of inlet and exhaust holes formed in the outer periphery for supplying or draining the cooling gas and having an end region, said rotor including a fan for circulating the cooling gas;

a cooler arranged in a path communicating with the fan inlet region of said casing for cooling the gas to be introduced to the fan inlet region;

a first cooling gas flow path for introducing the cooled gas from the outlet of said fan directly to said end region of said rotor a second cooling gas flow path for introducing the cooled gas from said outlet of said fan to said inlet holes through first radial cooling ducts formed in said stator core;

a third gas flow path for introducing the gas exhausted in an armature region from said end region of said rotor to the inlet side of said cooler; and a fourth gas flow path for introducing the gas exhausted out of said exhaust holes to said inlet side of said cooler through second radial cooling ducts formed in said stator core.

2. A rotary electric machine according to claim 1, in which said fan is located in such a manner that the cooled gas flow pressurized by said fan is discharged to the outlet path.

3. A rotary electric machine according to claim 1, in which the first cooling gas path for directly introducing the cooled gas flow to the rotor end-winding region includes an end chamber communicating with the fan outlet path and disposed adjacent to said fan outlet, and a longitudinal path along the axis of said rotor which communicates with said rotor end-winding region.

4. A rotary electric machine according to claim 1, in which the second cooling gas path for introducing the cooled gas flow to the cooling paths for said stator core includes a casing end wall and a flow guide wall.

5. A rotary electric machine according to claim 1, in which a flow guide wall is arranged in such a manner that the gas flow from said rotor end-winding is discharged to an armature end portion communicating with the inlet of said cooler.

* * * * *